(12) United States Patent
Steidl et al.

(10) Patent No.: US 12,427,726 B2
(45) Date of Patent: Sep. 30, 2025

(54) SYSTEM FOR APPLYING ADHESIVE

(71) Applicant: Schaeffler Technologies AG & Co. KG, Herzogenaurach (DE)

(72) Inventors: Brad Steidl, Medina, OH (US); Ryan Young, West Salem, OH (US); Murat Bakan, Canton, OH (US); Roushanak Nejat, Akron, OH (US); Norman Brenneman, Dalton, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 134 days.

(21) Appl. No.: 18/519,718

(22) Filed: Nov. 27, 2023

(65) Prior Publication Data

US 2025/0170784 A1    May 29, 2025

(51) Int. Cl.
*B29C 65/54*    (2006.01)
*B29C 65/78*    (2006.01)
*B29L 31/08*    (2006.01)

(52) U.S. Cl.
CPC ........ *B29C 65/542* (2013.01); *B29C 65/7802* (2013.01); *B29L 2031/08* (2013.01)

(58) Field of Classification Search
CPC ............. B29L 2031/08; B29C 65/7802; B29C 65/542
See application file for complete search history.

(56) References Cited

U.S. PATENT DOCUMENTS

| 5,359,763 A | 11/1994 | Neuenschwander |
| 2022/0323981 A1* | 10/2022 | Zhou ..................... B05B 7/0892 |
| 2023/0198354 A1* | 6/2023 | Xiang ..................... B21D 28/26 |

OTHER PUBLICATIONS

Machine translation of KR 20230156374 (Year: 2023).*

* cited by examiner

*Primary Examiner* — Vishal I Patel
(74) *Attorney, Agent, or Firm* — Price Heneveld LLP

(57) ABSTRACT

An adhesive applicator for applying adhesive to a lamination of a core of an electric motor has a first substrate having an adhesive flow passage for conveying adhesive and an air flow passage for conveying pressurized air, a second substrate having a second substrate passage, and a slider having a slider passage. The slider is between the first and second substrates and moves between first and second positions. In the first position, the slider passage receives adhesive from the adhesive flow passage. In the second position, pressurized air from the air flow passage propels adhesive out of the slider passage, into the second substrate passage, out of the second substrate passage, and onto the lamination of the core.

16 Claims, 7 Drawing Sheets

SYSTEM FOR APPLYING ADHESIVE

FIELD OF THE DISCLOSURE

The present disclosure generally relates to a system for applying adhesives to a substrate. More specifically, the present disclosure relates to a system that includes an adhesive applicator for applying adhesives to a substrate, such as a lamination of a stator core or a rotor core of an electric motor.

BACKGROUND OF THE DISCLOSURE

Stator cores and rotor cores for electric motors include laminations that are typically coupled to each other by mechanical means, such as metal tabs.

SUMMARY OF THE DISCLOSURE

According to a first aspect of the present disclosure, an adhesive applicator for applying adhesive to a lamination of a core of an electric motor includes a first substrate having an adhesive flow passage extending therein for conveying adhesive toward an adhesive flow passage outlet and an air flow passage extending therein for conveying pressurized air toward an air flow passage outlet. The adhesive applicator also includes a second substrate having a second substrate passage extending therein that includes a second substrate passage inlet, that is aligned with the air flow passage outlet and offset from the adhesive flow passage outlet, and a second substrate passage outlet. The adhesive applicator further includes a slider that has a slider passage that includes a slider passage inlet and a slider passage outlet. The slider is disposed between the first and second substrates and operable to move between a first position and a second position. In the first position, the slider passage inlet is aligned with the adhesive flow passage outlet such that the slider passage is configured to receive adhesive therein from the adhesive flow passage. In the second position, the slider passage inlet is aligned with the air flow passage outlet and the slider passage outlet is aligned with the second substrate passage inlet such that the slider passage inlet is configured to receive pressurized air that is conveyed from the air flow passage through the air flow passage outlet to propel adhesive received within the slider passage out of the slider passage through the slider passage outlet, into the second substrate passage through second substrate passage inlet, out of the second substrate passage through the second substrate passage outlet, and onto the lamination of the core.

Embodiments of the first aspect of the disclosure can include any one or a combination of the following features:
a first outer seal that extends between the first substrate and the slider and that forms a ring about the adhesive flow passage outlet, the air flow passage outlet, and the slider passage inlet in the first and second positions of the slider, a second outer seal that extends between the second substrate and the slider and that forms a ring about the second substrate passage inlet and the slider passage outlet in the first and second positions of the slider, a first inner seal that extends between the first substrate and the slider and that forms a ring about the air flow passage outlet and the slider passage inlet in the second position of the slider, wherein the adhesive flow passage outlet is outside of the ring formed by the first inner seal, and the slider passage inlet is outside of the ring formed by the first inner seal in the first position of the slider, and a second inner seal that extends between the second substrate and the slider and that forms a ring about the second substrate passage inlet and the slider passage outlet in the second position of the slider, wherein the slider passage outlet is outside of the ring formed by the second inner seal in the first position of the slider;
an air flow passage inlet of the air flow passage, the air flow passage outlet, the slider passage inlet, the slider passage outlet, the second substrate passage inlet, and the second substrate passage outlet are linearly aligned with each other in the second position of the slider;
the slider is configured to move between the first and second positions via translation;
a maximum width of the slider passage inlet is less than a maximum width of the air flow passage outlet and less than a maximum width of the adhesive flow passage outlet;
the maximum width of the slider passage inlet is substantially equal to a maximum width of the slider passage outlet, a maximum width of the second substrate passage inlet, and a maximum width of the second substrate passage outlet;
the adhesive flow passage is defined by the first substrate, the air flow passage is defined by the first substrate, the second substrate passage is defined by the second substrate, and the slider passage is defined by the slider;
the first substrate is a bottom substrate, the second substrate is a top substrate, and the slider is positioned vertically between the first and second substrates;
the slider is operable to move horizontally between the first and second positions, and wherein, in the second position, the slider passage and the second substrate passage are horizontally aligned, such that the second substrate passage is oriented to receive the adhesive that is propelled vertically upward from the slider passage via the pressurized air;
at least one of the first substrate and the second substrate is formed of plastic;
the slider is formed of metal; and
at least a portion of the slider is coated with a diamond-like carbon coating.

According to a second aspect of the present disclosure, a system for applying adhesive to a receiving substrate includes an adhesive dispenser for dispensing adhesive, a pressurized air supplier, an actuator, and an adhesive applicator. The adhesive applicator includes a first substrate having an adhesive flow passage extending therein and in fluid communication with the adhesive dispenser, such that the adhesive flow passage is configured to convey adhesive dispensed from the adhesive dispenser toward an adhesive flow passage outlet. The first substrate further has an air flow passage extending therein and in fluid communication with the pressurized air supplier, such that the air flow passage is configured to convey pressurized air supplied by the pressurized air supplier toward an air flow passage outlet. The adhesive applicator also includes a second substrate having a second substrate passage extending therein that includes a second substrate passage inlet, that is aligned with the air flow passage outlet and offset from the adhesive flow passage outlet, and a second substrate passage outlet. The adhesive applicator further includes a slider having a slider passage that includes a slider passage inlet and a slider passage outlet. The slider is disposed between the first and second substrates and is operably coupled with the actuator such that the slider is operable to move, via actuation of the actuator, between a first position and a second position. In the first position, the slider passage inlet is aligned with the adhesive flow passage outlet such that the slider passage is configured to receive adhesive therein from the adhesive flow passage. In the second position, the slider passage inlet is aligned with the air flow passage outlet and the slider passage outlet is aligned with the second substrate passage inlet such that the slider passage inlet is configured to receive pressurized air that is conveyed from the air flow passage through the air flow passage outlet to propel adhesive received within the slider passage out of the slider passage through the slider passage outlet, into the second substrate passage through second substrate passage inlet, out of the second substrate passage through the second substrate passage outlet, and onto the receiving substrate.

Embodiments of the second aspect of the disclosure can include any one or a combination of the following features:

a first outer seal that extends between the first substrate and the slider and that forms a ring about the adhesive flow passage outlet, the air flow passage outlet, and the slider passage inlet in the first and second positions of the slider, a second outer seal that extends between the second substrate and the slider and that forms a ring about the second substrate passage inlet and the slider passage outlet in the first and second positions of the slider, a first inner seal that extends between the first substrate and the slider and that forms a ring about the air flow passage outlet and the slider passage inlet in the second position of the slider, wherein the adhesive flow passage outlet is outside of the ring formed by the first inner seal, and the slider passage inlet is outside of the ring formed by the first inner seal in the first position of the slider, and a second inner seal that extends between the second substrate and the slider and that forms a ring about the second substrate passage inlet and the slider passage outlet in the second position of the slider, wherein the slider passage outlet is outside of the ring formed by the second inner seal in the first position of the slider;

the actuator is a linear actuator; and the pressurized air supplier is configured to supply blasts of pressurized air intermittently.

According to a third aspect of the present disclosure, a method of applying adhesive includes the step of dispensing a dose of adhesive into a slider passage of a slider that is disposed between a first substrate and a second substrate in a first position. In the first position, a slider passage outlet of the slider passage is offset from a second substrate passage inlet of a second substrate passage of the second substrate and a slider passage inlet of the slider passage is offset from an air flow passage outlet of an air flow passage of the first substrate. The method also includes the step of moving the slider to a second position. In the second position, the slider passage outlet is aligned with the second substrate passage inlet, and the slider passage inlet is aligned with the air flow passage outlet. The method further includes the step of supplying pressurized air into the air flow passage to propel the dose of adhesive out of the slider passage through the slider passage outlet in the second position of the slider, into the second substrate passage through the second substrate passage inlet, out of the second substrate passage through a second substrate passage outlet of the second substrate passage, and onto a receiving substrate.

Embodiments of the third aspect of the disclosure can include any one or a combination of the following features:

the step of moving the slider to a second position includes translating the slider to the second position via actuation of an actuator coupled to the slider;

the step of supplying the pressurized air into the air flow passage includes directing the pressurized air substantially vertically upward within the air flow passage to propel the dose of adhesive substantially vertically upward onto the receiving substrate; and an air flow passage inlet of the air flow passage, the air flow passage outlet, the slider passage inlet, the slider passage outlet, the second substrate passage inlet, and the second substrate passage outlet are linearly aligned with each other in the second position of the slider.

These and other features, advantages, and objects of the present disclosure will be further understood and appreciated by those skilled in the art by reference to the following specification, claims, and appended drawings.

Figure 1:
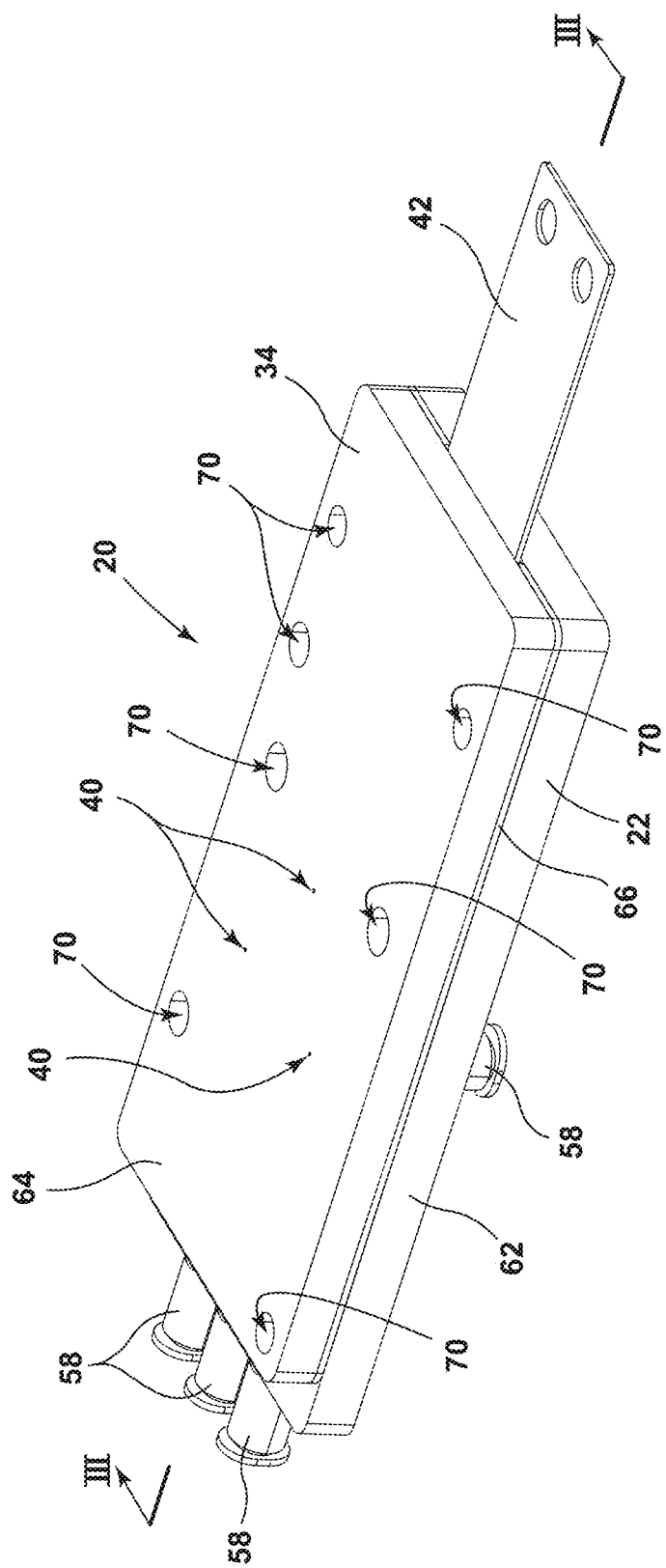
FIG. 1 is a top perspective view of an adhesive applicator that includes a first substrate, a second substrate, and a slider positioned between the first and second substrates.

The components in the figures are not necessarily to scale, emphasis instead being placed upon illustrating the principles described herein.

DETAILED DESCRIPTION

Additional features and advantages of the disclosure will be set forth in the detailed description which follows and will be apparent to those skilled in the art from the description, or recognized by practicing the disclosure as described in the following description, together with the claims and appended drawings.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

In this document, relational terms, such as "first" and "second," "top" and "bottom," and the like, are used solely to distinguish one entity or action from another entity or action, without necessarily requiring or implying any actual such relationship or order between such entities or actions.

For purposes of this disclosure, the term "coupled" (in all of its forms: couple, coupling, coupled, etc.) generally means the joining of two components (electrical or mechanical) directly or indirectly to one another. Such joining may be stationary in nature or movable in nature. Such joining may be achieved with the two components (electrical or mechanical) and/or any additional intermediate members. Such joining may include members being integrally formed as a single unitary body with one another (i.e., integrally coupled) or may refer to joining of two components. Such joining may be permanent in nature, or may be removable or releasable in nature, unless otherwise stated.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein, the terms "the," "a," or "an," mean "at least one," and should not be limited to "only one" unless explicitly indicated to the contrary. Thus, for example, reference to "a component" includes embodiments having two or more such components unless the context clearly indicates otherwise.

Referring now to FIGS. 1-7, a system 10 for applying adhesive 12 to a receiving substrate 50 includes an adhesive dispenser 14 for dispensing adhesive 12, a pressurized air supplier 16, and an actuator 18. The system 10 further includes an adhesive applicator 20. The adhesive applicator 20 includes a first substrate 22. The first substrate 22 has an adhesive flow passage 24 that extends therein. The adhesive flow passage 24 is in fluid communication with the adhesive dispenser 14, such that the adhesive flow passage 24 is configured to convey adhesive 12 dispensed from the adhesive dispenser 14 toward an adhesive flow passage outlet 26 of the adhesive flow passage 24. The first substrate 22 has an air flow passage 28 that extends therein. The air flow passage 28 is in fluid communication with the pressurized air supplier 16, such that the air flow passage 28 is configured to convey pressurized air 30 supplied by the pressurized air supplier 16 toward an air flow passage outlet 32. The adhesive applicator 20 includes a second substrate 34. The second substrate 34 includes a second substrate passage 36 that extends therein and that includes a second substrate passage inlet 38. The second substrate passage inlet 38 is aligned with the air flow passage outlet 32 and is offset from the adhesive flow passage outlet 26. The second substrate passage 36 includes a second substrate passage outlet 40. The adhesive applicator 20 includes a slider 42 that has a slider passage 44. The slider passage 44 includes a slider passage inlet 46 and a slider passage outlet 48. The slider 42 is disposed between the first and second substrates 22, 34 and is operably coupled with the actuator 18, such that the slider 42 is operable to move, via actuation of the actuator 18, between a first position and a second position. In the first position of the slider 42, the slider passage inlet 46 is aligned with the adhesive flow passage outlet 26 such that the slider passage 44 is configured to receive adhesive 12 therein from the adhesive flow passage 24. In the second position of the slider 42, the slider passage inlet 46 is aligned with the air flow passage outlet 32 and the slider passage outlet 48 is aligned with the second substrate passage inlet 38. As such, the slider passage inlet 46 is configured to receive pressurized air 30 that is conveyed from the air flow passage 28 through the air flow passage outlet 32 to propel adhesive 12 received within the slider passage 44. The adhesive 12 received within the slider passage 44 is propelled out of the slider passage 44 through the slider passage outlet 48, into the second substrate passage 36 through the second substrate passage inlet 38, out of the second substrate passage 36 through the second substrate passage outlet 40, and onto the receiving substrate 50.

Figure 3:
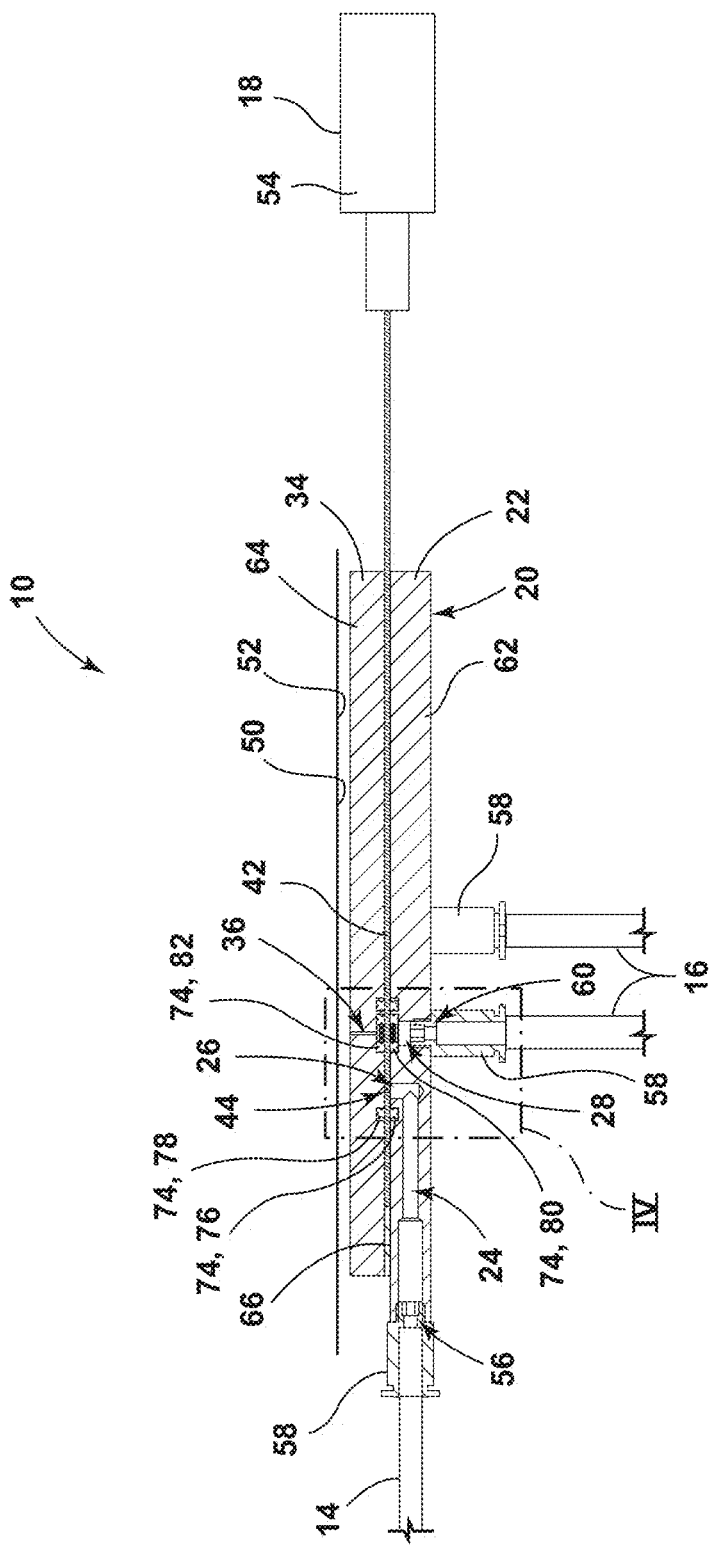
FIG. 3 is a cross-sectional view of the adhesive applicator of FIG. 1 taken at line III-III, illustrating the slider in a first position and a plurality of additional components of a system for applying adhesive to a receiving substrate including a pressurized air supplier, an actuator, and an adhesive dispenser.
Figure 4:
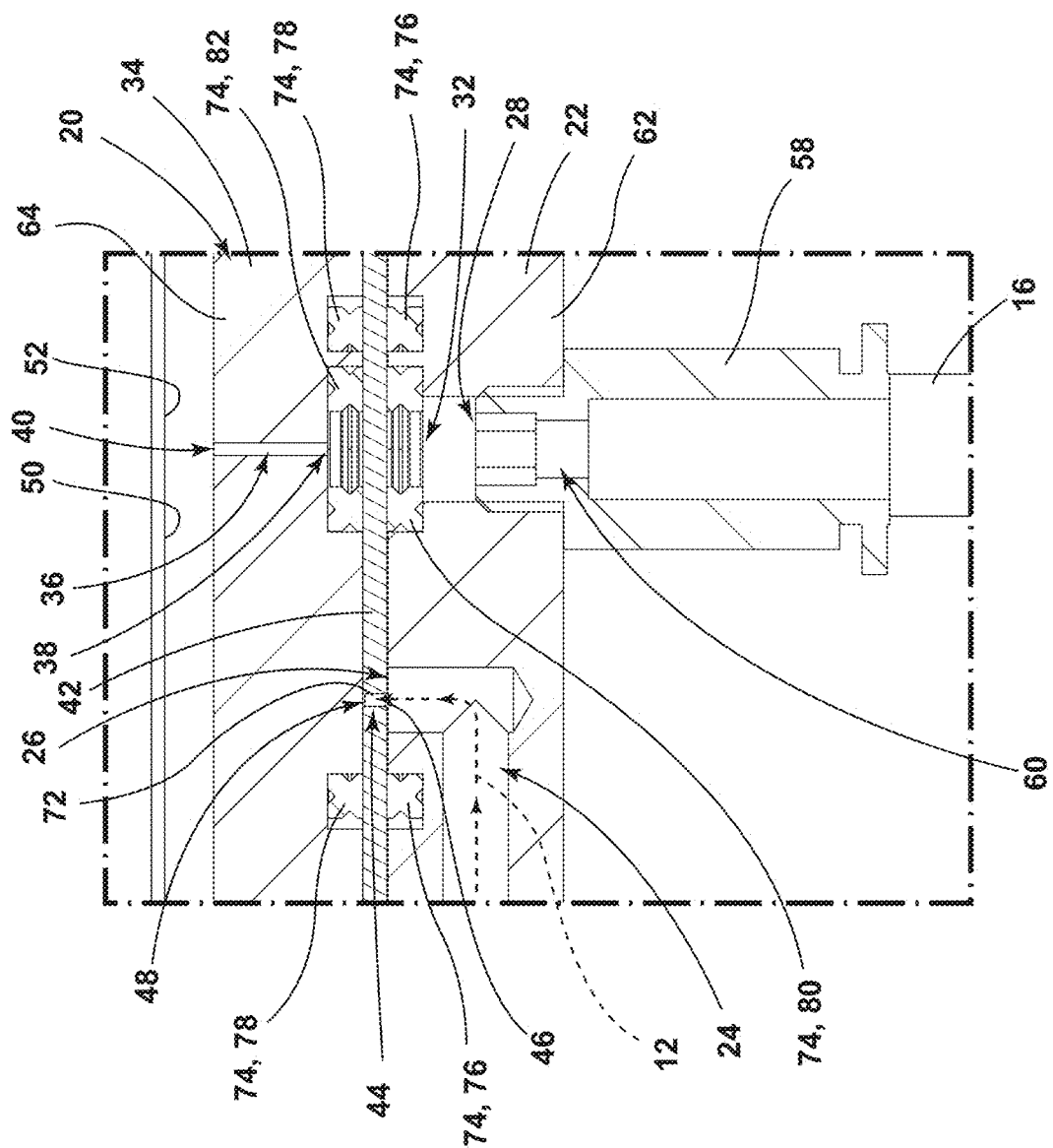
FIG. 4 is an enlarged view of area IV of FIG. 3, illustrating portions of the first substrate, the second substrate, and the slider in the first position.

Referring now to FIG. 3, the system 10 is configured for applying adhesive 12 to the receiving substrate 50. A variety of types of receiving substrates 50 are contemplated. In some implementations, the receiving substrate 50 is a metal substrate. In some embodiments, the system 10 is configured for applying adhesive 12 to laminations 52 of a stator core and/or a rotor core for an electric motor. As illustrated in FIGS. 3 and 4, an exemplary receiving substrate 50 is positioned upward of the second substrate 34 to receive adhesive 12 thereon from the second substrate passage 36. The system 10 for applying adhesive 12 may utilize one or more of a variety of types of adhesives 12. In some implementations, the system 10 may apply an anaerobic adhesive that reacts when exposed to metal, such as a steel substrate, to cause the adhesive 12 to adhere to the metal.

The system 10 for applying adhesive 12 includes the adhesive dispenser 14. The adhesive dispenser 14 is configured to dispense adhesive 12. In various implementations, the adhesive dispenser 14 dispenses adhesive 12 into another component of the system 10 for applying adhesive 12, such as the adhesive applicator 20, as described further herein. The adhesive dispenser 14 may generally include a reservoir that contains yet-to-be dispensed adhesive 12, as well as a dispensing feature that causes the adhesive 12 to be dispensed, such as a pump.

The system 10 for applying adhesive 12 can further include a pressurized air supplier 16. In an exemplary implementation, the pressurized air supplier 16 includes an air compressor and a nozzle or other outlet that releases pressurized air 30 from the air compressor. A variety of types of pressurized air suppliers 16 are contemplated. Further, it is to be understood that, as used herein, the term "air" is not limited to a given composition of gas or gases but can include one or more of a variety of types of gas or combinations of gases (e.g., ambient air composition, carbon dioxide, etc.).

The system 10 for applying adhesive 12 can include the actuator 18. The actuator 18 may be configured to actuate to move the slider 42 between the first and second positions, as described further herein. A variety of types of actuators 18 may be used in the system 10 for applying adhesives 12. In some implementations, the actuator 18 is a linear actuator 54 that is configured to actuate to effect linear movement.

Figure 2:
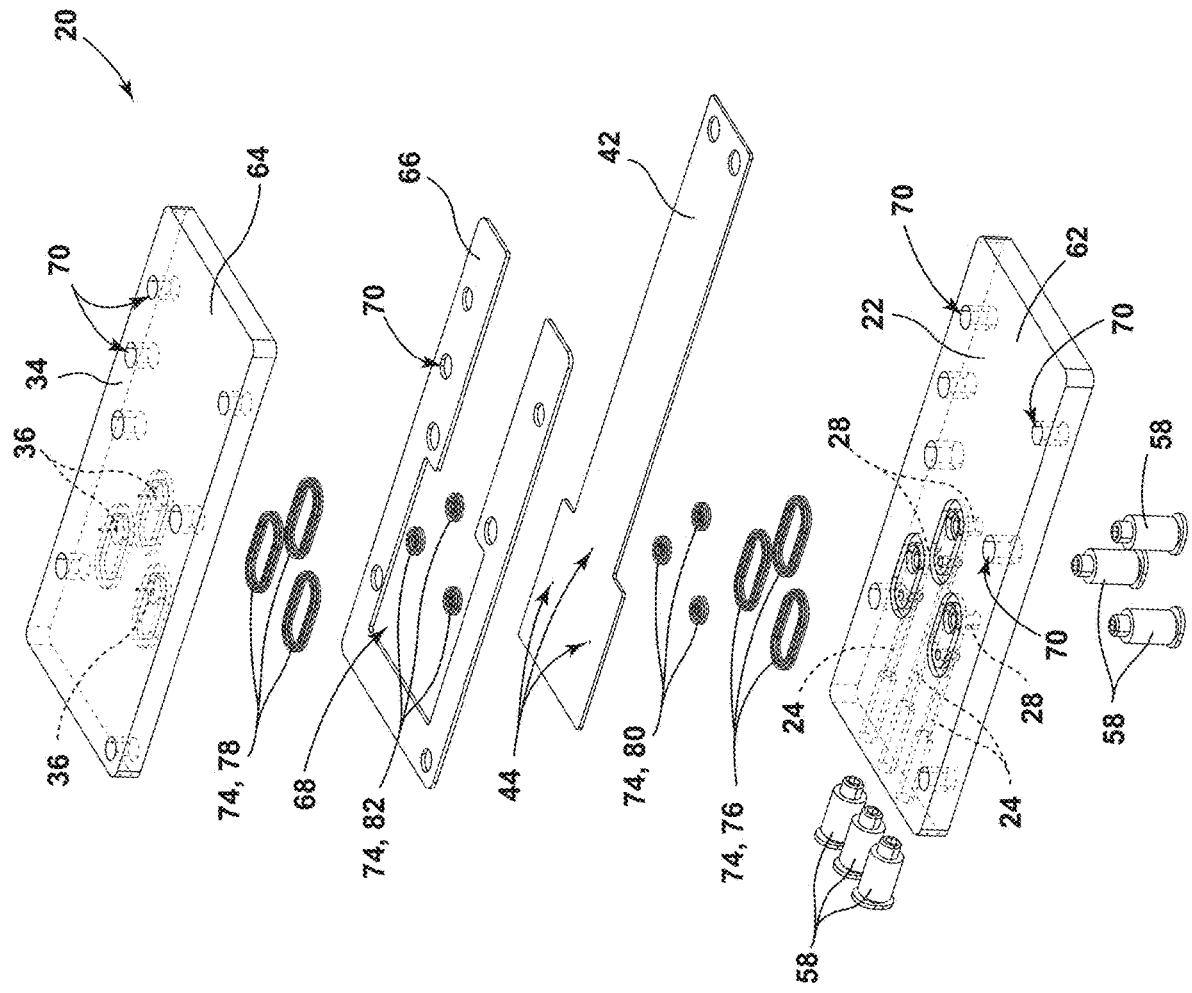
FIG. 2 is an exploded view of the adhesive applicator of FIG. 1.

Referring now to FIGS. 1-4, the system 10 for applying adhesive 12 includes the adhesive applicator 20. The adhesive applicator 20 includes the first substrate 22. As illustrated in FIGS. 3 and 4, the first substrate 22 includes the adhesive flow passage 24 extending therein. The adhesive flow passage 24 includes an adhesive flow passage inlet 56 and the adhesive flow passage outlet 26. The adhesive flow passage 24 is in communication with the adhesive dispenser 14, as illustrated in FIGS. 3 and 4. The adhesive flow passage 24 is configured for conveying adhesive 12 that is received from the adhesive dispenser 14 toward the adhesive flow passage outlet 26 of the adhesive flow passage 24. In the embodiment illustrated in FIG. 3, a fitting 58 is engaged with the first substrate 22 and with the adhesive dispenser 14, such that the adhesive dispenser 14 and the adhesive flow passage 24 are in fluid communication with each other for the purpose of conveying adhesive 12. In some implementations, the adhesive flow passage 24 can be defined by the first substrate 22. It is contemplated that the adhesive flow passage 24 of the first substrate 22 may be defined partially or wholly by another component, such as the fitting 58 engaged with the first substrate 22, in some implementations. Further, in some implementations, the first substrate 22 may include a plurality of adhesive flow passages 24, as illustrated in FIG. 2.

The first substrate 22 of the adhesive applicator 20 may include the air flow passage 28 that extends therein. The air flow passage 28 of the first substrate 22 is configured to convey pressurized air 30 toward the air flow passage outlet 32 of the air flow passage 28. As illustrated in FIG. 4, the air flow passage 28 of the first substrate 22 includes the air flow passage outlet 32 and an air flow passage inlet 60. The air flow passage 28 of the first substrate 22 is configured to be in communication with the pressurized air supplier 16 of the system 10 for applying adhesive 12. In the embodiment illustrated in FIG. 3, the fitting 58 is engaged with the first substrate 22 and with the pressurized air supplier 16, such that the air flow passage 28 and the pressurized air supplier 16 are in fluid communication with each other. The air flow passage 28 can be defined by the first substrate 22. It is contemplated that the air flow passage 28 may be defined partially or wholly by another component, such as the fitting 58 that is engaged with the first substrate 22, in some implementations. In various embodiments, the first substrate 22 can include a plurality of air flow passages 28, as illustrated exemplarily in FIG. 2.

The first substrate 22 of the adhesive applicator 20 can be formed of one or more of a variety of materials. In various implementations, the first substrate 22 can be formed of a non-metal material, such as plastic. Various plastics are contemplated. In some embodiments, the first substrate 22 can be formed of a coated metal, such as a coated steel. A variety of types of coatings are contemplated. For example, the first substrate 22 can be a steel substrate that is coated in a diamond-like carbon coating. Further, various portions of the adhesive applicator 20 may have a variety of types of surface finishes. For example, metal portions of the adhesive applicator 20 that are coated with the diamond-like carbon coating may be polished to have a roughness average of 0.1 micrometers (Ra0.1).

Referring still to FIGS. 1-4, the adhesive applicator 20 of the system 10 includes the second substrate 34. As illustrated in FIG. 4, the second substrate 34 includes the second substrate passage 36 that extends therein. The second substrate passage 36 includes the second substrate passage inlet 38 and the second substrate passage outlet 40. The second substrate passage inlet 38 is configured to be aligned with the air flow passage outlet 32 of the first substrate 22, as illustrated in FIG. 4. In various implementations, the second substrate passage outlet 40 is offset from the adhesive flow passage outlet 26 of the adhesive flow passage 24 of the first substrate 22. In various implementations, the second substrate passage 36 is defined by the second substrate 34. In the embodiment illustrated in FIG. 4, the second substrate passage 36 is an aperture that is defined by the second substrate 34 and that extends through the second substrate 34 from the second substrate passage inlet 38 to the second substrate passage outlet 40. It is contemplated that the second substrate passage 36 may be defined by another component that is coupled with the second substrate 34, in some implementations.

Referring still to FIGS. 1-4, in various embodiments, the adhesive applicator 20 is oriented such that the first substrate 22 is a bottom substrate 62 of the adhesive applicator 20, and the second substrate 34 is a top substrate 64 of the adhesive applicator 20 that is positioned vertically upward of the bottom substrate 62. For example, in the embodiment illustrated in FIGS. 1, 3, and 4, the first substrate 22 is positioned vertically below the second substrate 34, and the pressurized air supplier 16 is configured to supply pressurized air 30 in a vertically upward direction, as described further herein.

Referring now to FIGS. 1 and 2, the adhesive applicator 20 can include a spacer 66. The spacer 66 is positioned between the first and second substrates 22, 34 of the adhesive applicator 20 and is configured to maintain the first and second substrates 22, 34 in a spaced-relationship with each other. In the embodiment illustrated in FIG. 1, the spacer 66 is sandwiched vertically between the first and second substrates 22, 34, such that the first and second substrates 22, 34 are vertically spaced apart from each other. As illustrated in FIG. 2, the spacer 66 defines a hollow 68. The hollow 68 is configured to receive the slider 42 therein. The hollow 68 may be sized and shaped to accommodate movement of the slider 42 between the first and second positions, as described further herein. As illustrated in FIGS. 1 and 2, the first substrate 22, the second substrate 34, and the spacer 66 may include a plurality of apertures 70 for receiving fasteners therein to secure the first substrate 22, the second substrate 34, and the spacer 66 in use positions for consistent operation of the adhesive applicator 20.

Referring now to FIGS. 1-4, the adhesive applicator 20 includes the slider 42. The slider 42 is disposed between the first and second substrates 22, 34 of the adhesive applicator 20. In the embodiment illustrated in FIGS. 1-4, the slider 42 is positioned vertically between the first and second substrates 22, 34. The slider 42 can be coupled to the actuator 18 of the system 10, as described further herein. As illustrated in FIG. 4, the slider 42 includes the slider passage 44. The slider passage 44 includes the slider passage inlet 46 and the slider passage outlet 48. As illustrated in FIG. 4, the slider passage 44 is defined by the slider 42. In the illustrated embodiment, the slider passage 44 is an aperture that extends vertically through the slider 42. The slider 42 may be formed of one or more of a variety of materials. In an exemplary embodiment, the slider 42 is a steel slider, and at least a portion of the slider 42 is coated with a diamond-like carbon coating. In particular, the portions of the slider 42 that are exposed to the adhesive 12 in operation of the system 10 are coated with the diamond-like carbon coating. As such, the portion of the slider 42 that defines the slider passage 44 is coated with the diamond-like carbon coating. It is contemplated that the slider 42 may be formed of a variety of non-metals, such as plastic.

Figure 5:
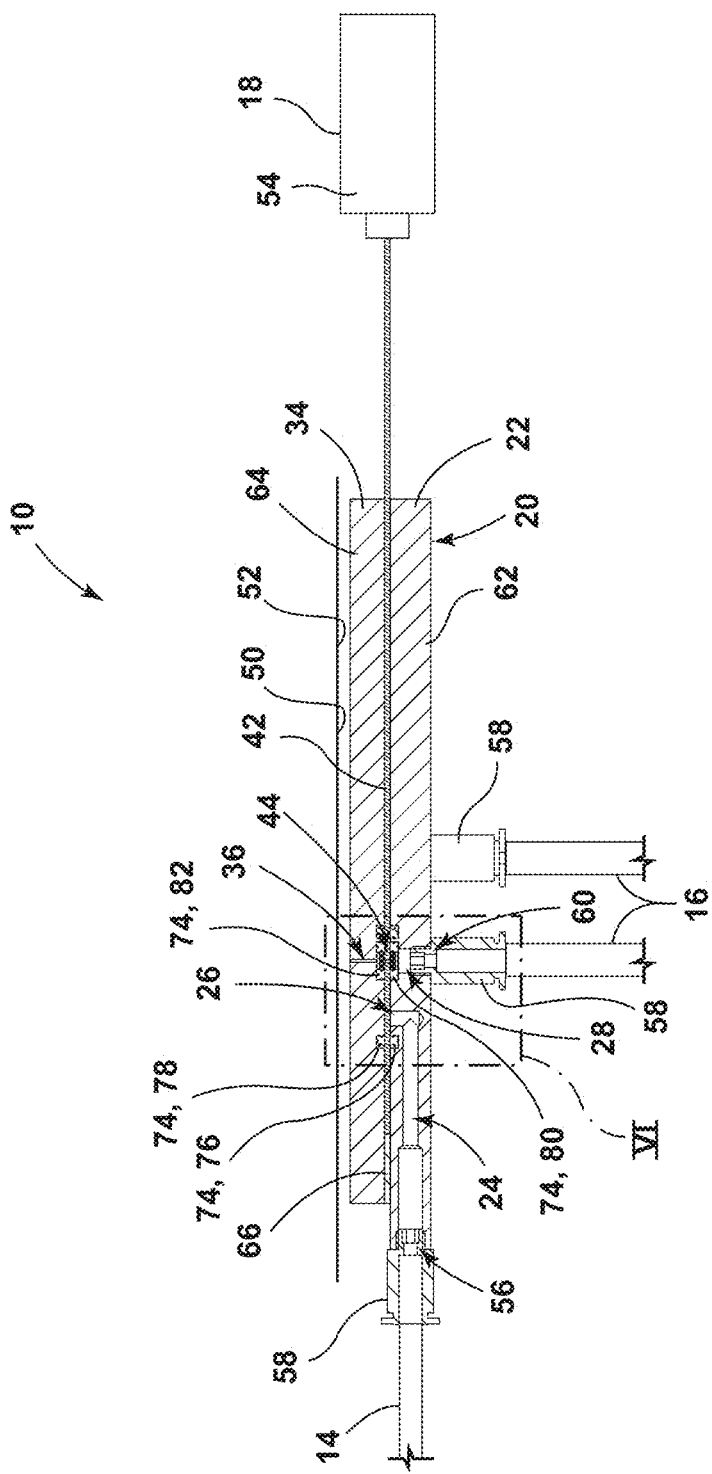
FIG. 5 is a cross-sectional view of the adhesive applicator, illustrating the slider in a second position, and the actuator, the adhesive dispenser, and the pressurized air supplier of the system for applying adhesive to a receiving substrate.
Figure 6:
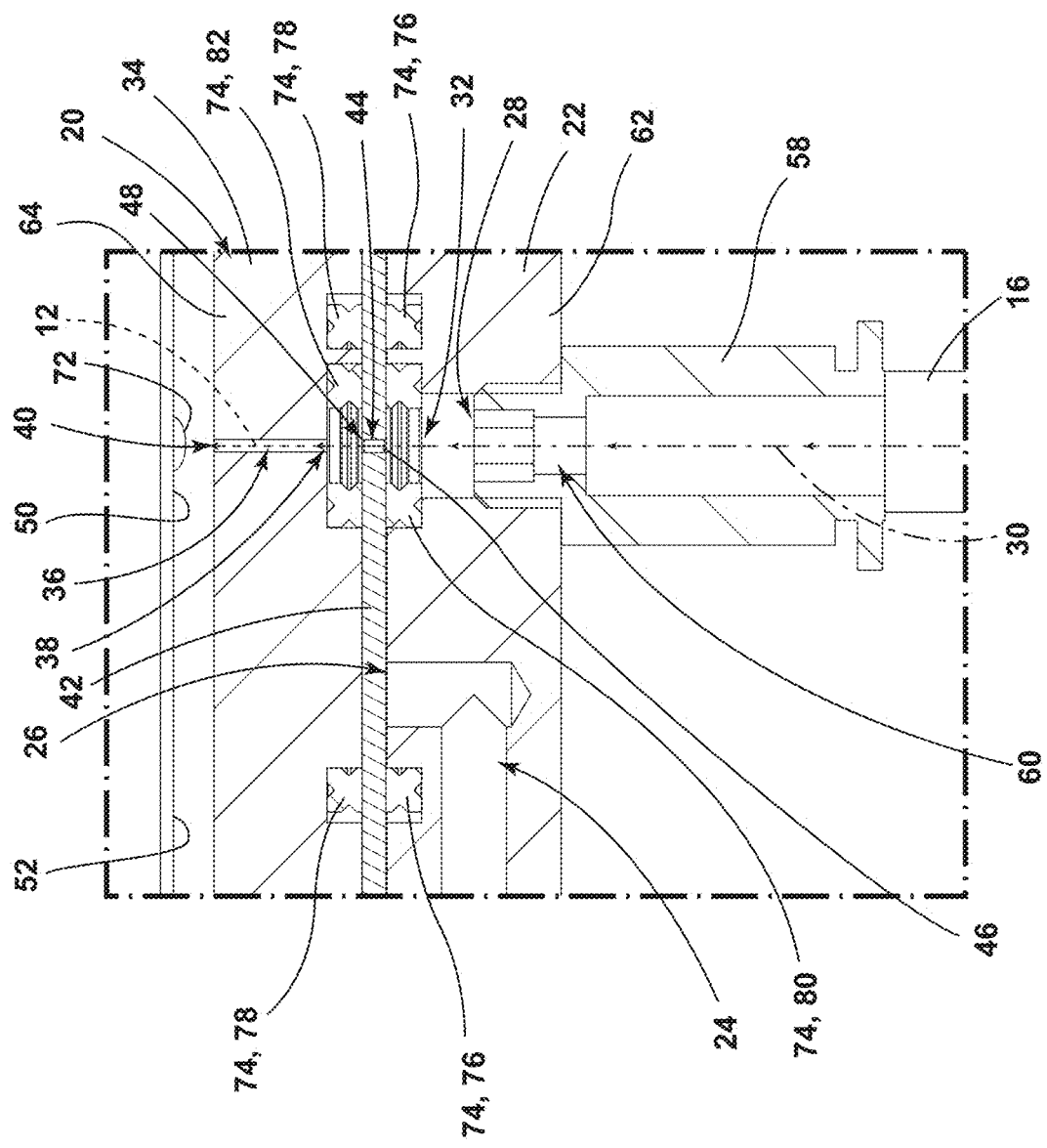
FIG. 6 is an enlarged view of area VI of FIG. 5, illustrating portions of the first substrate, the second substrate, the slider in the second position, a receiving substrate proximate to the second substrate, and adhesive applied to the receiving substrate.

Referring now to FIGS. 3-6, the slider 42 is disposed between the first and second substrates 22, 34 and is operable to move between the first position, as illustrated in FIGS. 3 and 4, and the second position, as illustrated in FIGS. 5 and 6. The slider 42 is operable to move relative to the first and second substrates 22, 34 between the first and second positions. In various implementations, the slider 42 moves between the first and second positions via actuation of the actuator 18 that is coupled to the slider 42. In some embodiments, the slider 42 translates between the first and second positions. For example, the system 10 for applying adhesive 12 can include the linear actuator 54 that, upon actuation, prompts translation of the slider 42 coupled thereto. In the embodiment illustrated in FIGS. 3-6, the linear actuator 54 causes horizontal translation of the slider 42 between the first and second positions.

Referring still to FIGS. 3-6, in the first position of the slider 42 (FIGS. 3 and 4), the slider passage inlet 46 is aligned with the adhesive flow passage outlet 26. As such, in operation of the system 10, the slider passage 44 is configured to receive a dose 72 of adhesive 12 therein from the adhesive flow passage 24 via the dispensing of adhesive 12 from the adhesive dispenser 14. In the first position, the slider passage inlet 46 is offset from the air flow passage outlet 32, and the slider passage outlet 48 is offset from the second substrate passage inlet 38, as illustrated in FIG. 4.

In the second position of the slider 42, the slider passage inlet 46 is offset from the adhesive flow passage outlet 26, as illustrated in FIG. 6. Further, the slider passage inlet 46 is aligned with the air flow passage outlet 32, and the slider passage outlet 48 is aligned with the second substrate passage inlet 38. As such, in the second position of the slider 42, the slider passage inlet 46 is configured to receive pressurized air 30 that is conveyed from the air flow passage 28 through the air flow passage outlet 32 to propel adhesive 12 received within the slider passage 44 (1) out of the slider passage 44 through the slider passage outlet 48, (2) into the second substrate passage 36 through the second substrate passage inlet 38, (3) out of the second substrate passage 36 through the second substrate passage outlet 40, and (4) onto the receiving substrate 50, such as the lamination 52 of the stator core and/or the rotor core of the electric motor.

As illustrated in FIG. 6, in the second position of the slider 42, the air flow passage inlet 60 of the air flow passage 28, the air flow passage outlet 32, the slider passage inlet 46, the slider passage outlet 48, the second substrate passage inlet 38, and the second substrate passage outlet 40 are linearly aligned with each other in the second position of the slider 42. In the embodiment illustrated in FIGS. 5 and 6, the first substrate 22 is the bottom substrate 62, the second substrate 34 is the top substrate 64, the slider 42 is positioned vertically between the first and second substrates 22, 34 in the second position, and the slider 42 is operable to move horizontally between the first and second positions. In the second position of the slider 42 in the illustrated embodiment, the slider passage 44 and the second substrate passage 36 are horizontally aligned, such that the second substrate passage 36 is oriented to receive the adhesive 12 that is propelled vertically upward from the slider passage 44 via the pressurized air 30.

As further illustrated in FIG. 6, in some embodiments, a maximum width of the slider passage inlet 46 is less than a maximum width of the aid flow passage outlet 32 and less than a maximum width of the adhesive flow passage outlet 26. In the embodiment illustrated in FIG. 6, the maximum width of the slider passage inlet 46 is substantially equal to a maximum width of the slider passage outlet 48, a maximum width of the second substrate passage inlet 38, and a maximum width of the second substrate passage outlet 40.

Referring now to FIGS. 2-6, the adhesive applicator 20 can include a plurality of seals 74. For example, in the embodiment illustrated in FIGS. 4-6, the adhesive applicator 20 includes first and second outer seals 76, 78 and first and second inner seals 80, 82. The first outer seal 76 extends between the first substrate 22 and the slider 42 and forms a ring about the adhesive flow passage outlet 26, the air flow passage outlet 32, and the slider passage inlet 46 in the first and second positions of the slider 42. The second outer seal 78 extends between the second substrate 34 and the slider 42 and forms a ring about the second substrate passage inlet 38 and the slider passage outlet 48 in the first and second positions of the slider 42. The first inner seal 80 extends between the first substrate 22 and the slider 42 and forms a ring about the air flow passage outlet 32 and the slider passage inlet 46 in the second position of the slider 42. As illustrated in FIG. 4, the adhesive flow passage outlet 26 is outside of the ring formed by the first inner seal 80, and the slider passage inlet 46 is outside of the ring formed by the first inner seal 80 in the first position of the slider 42. The second inner seal 82 of the adhesive applicator 20 extends between the second substrate 34 and the slider 42 and forms a ring about the second substrate passage inlet 38 and the slider passage outlet 48 in the second position of the slider 42. The slider passage outlet 48 is outside of the ring formed by the second inner seal 82 in the first position of the slider 42, as illustrated in FIG. 4. It is to be understood that, as used herein, "ring" and its derivative uses, such as "to form a ring around," is not limited to a shape that is circular in profile or to a shape that has a circular outline. For example, as illustrated in FIG. 2, the first and second outer seals 76, 78 have generally stadium-shaped outlines. Further, as illustrated in FIGS. 4 and 6, the profiles of the first and second inner seals 80, 82 and the profiles of the first and second outer seals 76, 78 are generally X-shaped. As illustrated in FIG. 2, in various embodiments, the adhesive applicator 20 may include a plurality of first and second inner seals 80, 82 and a plurality of corresponding first and second outer seals 76, 78.

In operation of an exemplary embodiment of the system 10 for applying adhesive 12, adhesive 12 is dispensed into the adhesive flow passage 24 of the first substrate 22 by the adhesive dispenser 14 while the slider 42 is in the first position. As the slider 42 is in the first position, adhesive 12 flows out of the adhesive flow passage outlet 26 and into the slider passage 44 via the slider passage inlet 46, such that a dose 72 of adhesive 12 is received within the slider passage 44. Any excess adhesive 12 that may reside between the first substrate 22 and the slider 42 or the second substrate 34 and the slider 42 outside of the slider passage 44 is retained within the ring formed by the first outer seal 76 and/or the ring formed by the second outer seal 78.

Next, the actuator 18 actuates to move the slider 42 from the first position, as illustrated in FIGS. 3 and 4, to the second position, as illustrated in FIGS. 5 and 6. As the slider 42 moves to the second position, the slider passage 44 moves from outside of the rings formed by the first and second inner seals 80, 82 to within the rings formed by the first and second inner seals 80, 82. The first and second inner seals 80, 82 are configured to restrict adhesive 12 other than the dose 72 that is received within the slider passage 44 from entering the rings defined by the first and second inner seals 80, 82, such that the amount of adhesive 12 within the first and second inner seals 80, 82 is limited to the dose 72 received within the slider passage 44 in the second position of the slider 42.

Generally coincident with the slider 42 entering the second position, a blast of pressurized air 30 is released from the pressurized air supplier 16. The pressurized air 30 flows out of the air flow passage outlet 32 and propels the dose 72 of adhesive 12 received within the slider passage 44 out of the slider passage outlet 48, into the second substrate passage inlet 38, out of the second substrate passage outlet 40, and finally onto the receiving substrate 50 proximate to the second substrate 34, as illustrated in FIG. 6. Next, the slider 42 moves back to the first position to receive another dose 72 of adhesive 12, and the process repeats with another receiving substrate 50 positioned proximate to the second substrate 34 to receive adhesive 12 thereon. In the exemplary embodiment, the pressurized air supplier 16 intermittently releases blasts of pressurized air 30 that generally coincide with the slider 42 reaching the second position. It is contemplated that the pressurized air supplier 16 may continuously release pressurized air 30, in some implementations.

Figure 7:
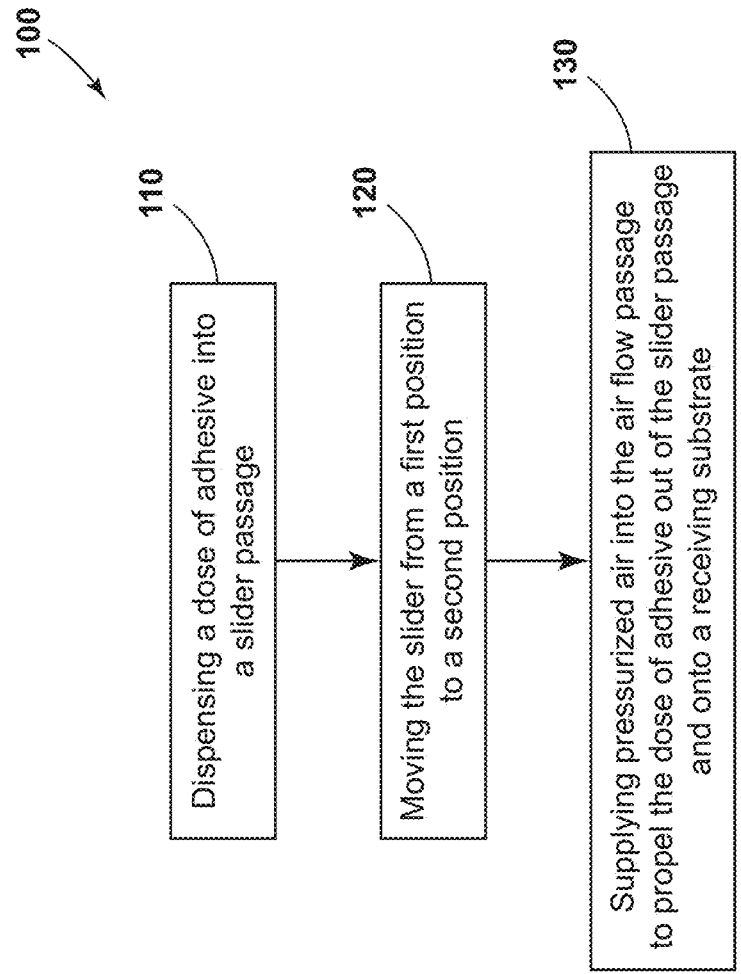
FIG. 7 is a block diagram of a method of applying adhesive.

Referring now to FIG. 7, a method 100 of applying adhesive 12 is illustrated. The method 100 includes the step 110 of dispensing a dose 72 of adhesive 12 into a slider passage 44 of a slider 42. In various implementations, the slider 42 is disposed between the first substrate 22 and the second substrate 34 in the first position. The slider passage outlet 48 of the slider passage 44 is offset from the second substrate passage inlet 38 of the second substrate passage 36 of the second substrate 34. The slider passage inlet 46 of the slider passage 44 may be offset from the air flow passage outlet 32 of the air flow passage 28 of the first substrate 22 in the first position.

The method 100 of applying adhesive 12 may include the step 120 of moving the slider 42 from the first position to the second position. In the second position, the slider passage outlet 48 may be aligned with the second substrate passage inlet 38, and the slider passage inlet 46 may be aligned with the air flow passage outlet 32, as illustrated in FIG. 6. The slider 42 may be moved to the second position at step 120 via the actuator 18. In various implementations, the slider 42 may be moved to the second position via translation by the actuator 18.

Referring still to FIG. 7, the method 100 of applying the adhesive 12 may include the step 130 of supplying pressurized air 30 into the air flow passage 28 to propel the dose 72 of adhesive 12 out of the slider passage 44 and onto the receiving substrate 50. In various implementations, the dose 72 of adhesive 12 is propelled out of the slider passage 44 through the slider passage outlet 48 in the second position of the slider 42, and further into the second substrate passage 36 through the second substrate passage inlet 38, out of the second substrate passage 36 through the second substrate passage outlet 40, and then onto the receiving substrate 50. As illustrated in FIG. 6, in the second position of the slider 42, the air flow passage inlet 60, the air flow passage outlet 32, the slider passage inlet 46, the slider passage outlet 48, the second substrate passage inlet 38, and the second substrate passage outlet 40 are linearly aligned with each other.

The present disclosure may provide a variety of advantages. First, the first substrate 22, the second substrate 34, and/or the slider 42 being made of a non-metal material, such as plastic, and/or having a coating, such as a diamond-like carbon coating, may allow for use of an anaerobic adhesive within the adhesive applicator 20 of the system 10 for applying adhesive 12. Second, using an adhesive 12 to fix lamination 52 of a stator core or a rotor core together rather than by a mechanical fixing means may allow for a more efficient and cost-effective manner of manufacturing stator and/or cores for electric motors.

It is to be understood that variations and modifications can be made on the aforementioned structure without departing from the concepts of the present disclosure, and further it is to be understood that such concepts are intended to be covered by the following claims unless these claims by their language expressly state otherwise.

LIST OF REFERENCE NUMERALS 10 system
12 adhesive
14 adhesive dispenser
16 pressurized air supplier
18 actuator
20 adhesive applicator
22 first substrate
24 adhesive flow passage
26 adhesive flow passage outlet
28 air flow passage
30 pressurized air
32 air flow passage outlet
34 second substrate
36 second substrate passage
38 second substrate passage inlet
40 second substrate passage outlet
42 slider
44 slider passage
46 slider passage inlet
48 slider passage outlet
50 receiving substrate
52 lamination
54 linear actuator
56 adhesive flow passage inlet
58 fitting
60 air flow passage inlet
62 bottom substrate
64 top substrate
66 spacer
68 hollow
70 apertures
72 dose
74 seals
76 first outer seal
78 second outer seal
80 first inner seal
82 second inner seal
100 method
110 step of dispensing adhesive
120 step of moving the slider
130 step of supplying pressurized air

What is claimed is:

1. An adhesive applicator for applying adhesive to a lamination of a core of an electric motor, comprising:

a first substrate having an adhesive flow passage extending therein for conveying adhesive toward an adhesive flow passage outlet and an air flow passage extending therein for conveying pressurized air toward an air flow passage outlet;

a second substrate having a second substrate passage extending therein that includes a second substrate passage inlet, that is aligned with the air flow passage outlet and offset from the adhesive flow passage outlet, and a second substrate passage outlet; and a slider having a slider passage that includes a slider passage inlet and a slider passage outlet, the slider being disposed between the first and second substrates and operable to move between a first position, wherein the slider passage inlet is aligned with the adhesive flow passage outlet such that the slider passage is configured to receive adhesive therein from the adhesive flow passage, and a second position, wherein the slider passage inlet is aligned with the air flow passage outlet and the slider passage outlet is aligned with the second substrate passage inlet such that the slider passage inlet is configured to receive pressurized air that is conveyed from the air flow passage through the air flow passage outlet to propel adhesive received within the slider passage out of the slider passage through the slider passage outlet, into the second substrate passage through second substrate passage inlet, out of the second substrate passage through the second substrate passage outlet, and onto the lamination of the core.

2. The adhesive applicator of claim 1, further comprising:
a first outer seal that extends between the first substrate and the slider and that forms a ring about the adhesive flow passage outlet, the air flow passage outlet, and the slider passage inlet in the first and second positions of the slider;
a second outer seal that extends between the second substrate and the slider and that forms a ring about the second substrate passage inlet and the slider passage outlet in the first and second positions of the slider;
a first inner seal that extends between the first substrate and the slider and that forms a ring about the air flow passage outlet and the slider passage inlet in the second position of the slider, wherein the adhesive flow passage outlet is outside of the ring formed by the first inner seal, and the slider passage inlet is outside of the ring formed by the first inner seal in the first position of the slider; and
a second inner seal that extends between the second substrate and the slider and that forms a ring about the second substrate passage inlet and the slider passage outlet in the second position of the slider, wherein the slider passage outlet is outside of the ring formed by the second inner seal in the first position of the slider.

3. The adhesive applicator of claim 1, wherein an air flow passage inlet of the air flow passage, the air flow passage outlet, the slider passage inlet, the slider passage outlet, the second substrate passage inlet, and the second substrate passage outlet are linearly aligned with each other in the second position of the slider.

4. The adhesive applicator of claim 1, wherein the slider is configured to move between the first and second positions via translation.

5. The adhesive applicator of claim 1, wherein a maximum width of the slider passage inlet is less than a maximum width of the air flow passage outlet and less than a maximum width of the adhesive flow passage outlet.

6. The adhesive applicator of claim 5, wherein the maximum width of the slider passage inlet is substantially equal to a maximum width of the slider passage outlet, a maximum width of the second substrate passage inlet, and a maximum width of the second substrate passage outlet.

7. The adhesive applicator of claim 1, wherein the adhesive flow passage is defined by the first substrate, the air flow passage is defined by the first substrate, the second substrate passage is defined by the second substrate, and the slider passage is defined by the slider.

8. The adhesive applicator of claim 1, wherein the first substrate is a bottom substrate, the second substrate is a top substrate, and the slider is positioned vertically between the first and second substrates.

9. The adhesive applicator of claim 8, wherein the slider is operable to move horizontally between the first and second positions, and wherein, in the second position, the slider passage and the second substrate passage are horizontally aligned, such that the second substrate passage is oriented to receive the adhesive that is propelled vertically upward from the slider passage via the pressurized air.

10. The adhesive applicator of claim 1, wherein at least one of the first substrate and the second substrate is formed of plastic.

11. The adhesive applicator of claim 10, wherein the slider is formed of metal.

12. The adhesive applicator of claim 11, wherein at least a portion of the slider is coated with a diamond-like carbon coating.

13. A system for applying adhesive to a receiving substrate, comprising:
an adhesive dispenser for dispensing adhesive;
a pressurized air supplier;
an actuator; and
an adhesive applicator, comprising:
a first substrate having an adhesive flow passage extending therein and in fluid communication with the adhesive dispenser, such that the adhesive flow passage is configured to convey adhesive dispensed from the adhesive dispenser toward an adhesive flow passage outlet, the first substrate further having an air flow passage extending therein and in fluid communication with the pressurized air supplier, such that the air flow passage is configured to convey pressurized air supplied by the pressurized air supplier toward an air flow passage outlet;
a second substrate having a second substrate passage extending therein that includes a second substrate passage inlet, that is aligned with the air flow passage outlet and offset from the adhesive flow passage outlet, and a second substrate passage outlet; and
a slider having a slider passage that includes a slider passage inlet and a slider passage outlet, the slider being disposed between the first and second substrates and operably coupled with the actuator such that the slider is operable to move, via actuation of the actuator, between a first position, wherein the slider passage inlet is aligned with the adhesive flow passage outlet such that the slider passage is configured to receive adhesive therein from the adhesive flow passage, and a second position, wherein the slider passage inlet is aligned with the air flow passage outlet and the slider passage outlet is aligned with the second substrate passage inlet such that the slider passage inlet is configured to receive pressurized air that is conveyed from the air flow passage through the air flow passage outlet to propel adhesive received within the slider passage out of the slider passage through the slider passage outlet, into the second substrate passage through second substrate passage inlet, out of the second substrate passage through the second substrate passage outlet, and onto the receiving substrate.

14. The system of claim 13, further comprising:
a first outer seal that extends between the first substrate and the slider and that forms a ring about the adhesive flow passage outlet, the air flow passage outlet, and the slider passage inlet in the first and second positions of the slider;
a second outer seal that extends between the second substrate and the slider and that forms a ring about the second substrate passage inlet and the slider passage outlet in the first and second positions of the slider;
a first inner seal that extends between the first substrate and the slider and that forms a ring about the air flow passage outlet and the slider passage inlet in the second position of the slider, wherein the adhesive flow passage outlet is outside of the ring formed by the first inner seal, and the slider passage inlet is outside of the ring formed by the first inner seal in the first position of the slider; and a second inner seal that extends between the second substrate and the slider and that forms a ring about the second substrate passage inlet and the slider passage outlet in the second position of the slider, wherein the slider passage outlet is outside of the ring formed by the second inner seal in the first position of the slider.

15. The system of claim 13, wherein the actuator is a linear actuator.

16. The system of claim 13, wherein the pressurized air supplier is configured to supply blasts of pressurized air intermittently.

* * * * *